(12) United States Patent
Mochizuki et al.

(10) Patent No.: US 9,915,845 B2
(45) Date of Patent: Mar. 13, 2018

(54) LIQUID CRYSTAL DISPLAY DEVICE

(71) Applicant: Japan Display Inc., Minato-ku (JP)

(72) Inventors: Kazuhide Mochizuki, Tokyo (JP);
Hirotaka Hayashi, Tokyo (JP);
Hiroyuki Kimura, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/883,749

(22) Filed: Oct. 15, 2015

(65) Prior Publication Data

US 2016/0116813 A1    Apr. 28, 2016

(30) Foreign Application Priority Data

Oct. 28, 2014   (JP) .................................. 2014-219200

(51) Int. Cl.
| | |
|---|---|
| *G02F 1/1362* | (2006.01) |
| *G02F 1/1343* | (2006.01) |
| *G02F 1/1333* | (2006.01) |

(52) U.S. Cl.
CPC .. *G02F 1/136286* (2013.01); *G02F 1/134336* (2013.01); *G02F 1/136227* (2013.01); *G02F 1/133345* (2013.01)

(58) Field of Classification Search
CPC ......... G02F 1/136227; G02F 1/136286; G02F 1/133345
USPC .......................................................... 349/43
See application file for complete search history.

(56) References Cited

U.S. PATENT DOCUMENTS

| | | | | |
|---|---|---|---|---|
| 6,919,681 | B2* | 7/2005 | Cok ..................... | G09G 3/3216 |
| | | | | 313/500 |
| 2010/0013803 | A1 | 1/2010 | Noguchi et al. | |
| 2012/0248443 | A1* | 10/2012 | Katsui .................. | G02F 1/1368 |
| | | | | 257/57 |
| 2012/0300148 | A1* | 11/2012 | Hong ..................... | G09G 3/364 |
| | | | | 349/43 |
| 2013/0093658 | A1* | 4/2013 | Park ..................... | G02F 1/13452 |
| | | | | 345/92 |
| 2015/0062451 | A1* | 3/2015 | Ono .................. | G02F 1/136227 |
| | | | | 349/12 |
| 2015/0311237 | A1* | 10/2015 | Jo ..................... | G02F 1/136259 |
| | | | | 257/72 |
| 2016/0054625 | A1* | 2/2016 | Hsia .................. | G02F 1/136227 |
| | | | | 349/43 |

FOREIGN PATENT DOCUMENTS

JP            2010-26245        2/2010

* cited by examiner

*Primary Examiner* — Christopher Raabe
(74) *Attorney, Agent, or Firm* — Oblon, McClelland, Maier & Neustadt, L.L.P.

(57) ABSTRACT

According to one embodiment, a liquid crystal display device includes a first substrate, a second substrate and a liquid crystal layer. The first substrate includes a gate line extending in a first direction, a first signal line, a second signal line, a first semiconductor layer, a second semiconductor layer, an insulating film, a first contact hole, a second contact hole, a first pixel electrode and a second pixel electrode. The second contact hole is located opposite to the first contact hole in a second direction intersecting the first direction.

6 Claims, 10 Drawing Sheets

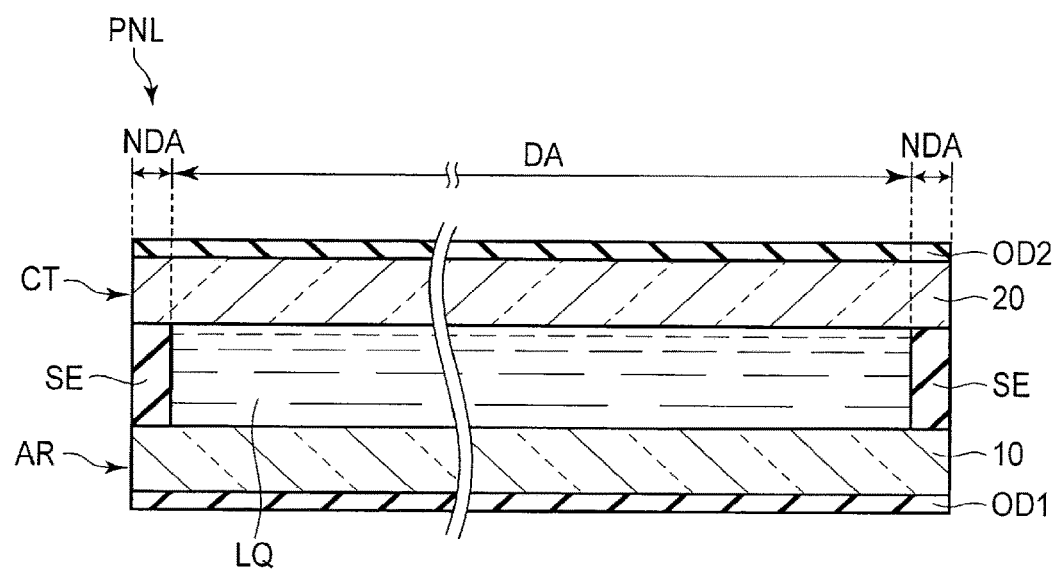
F I G. 2

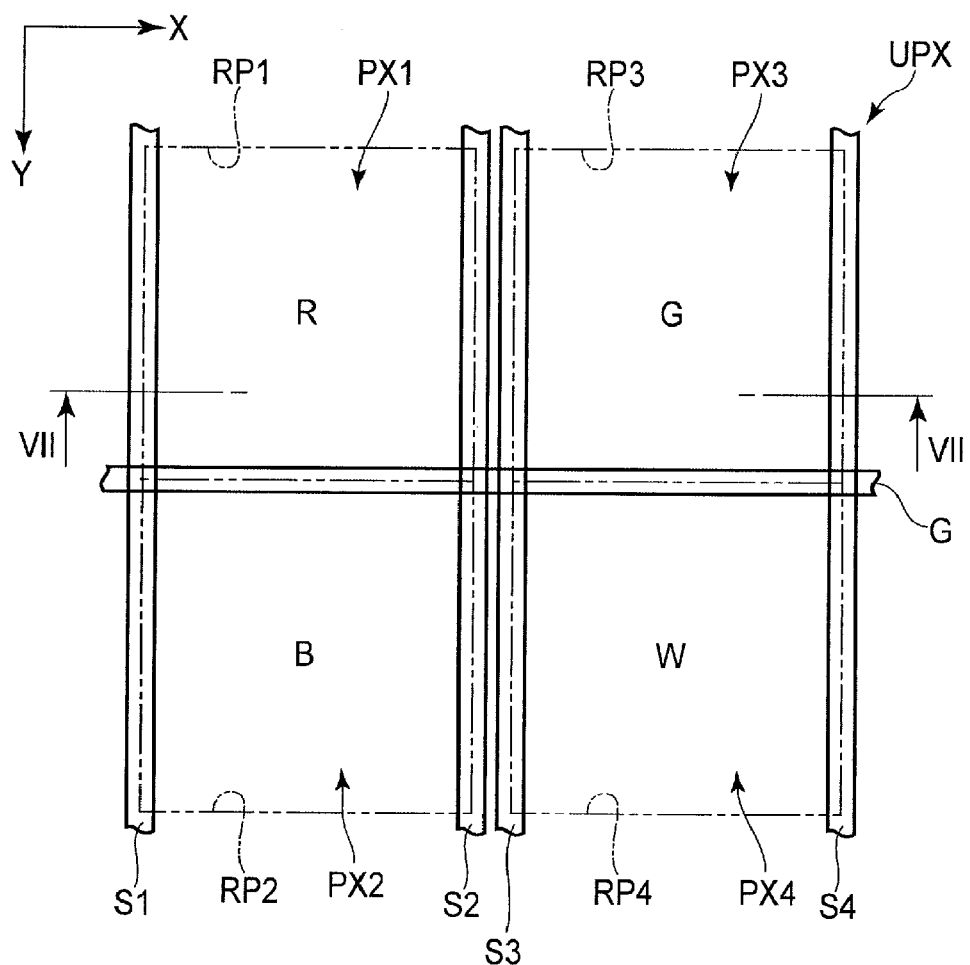
F I G. 4

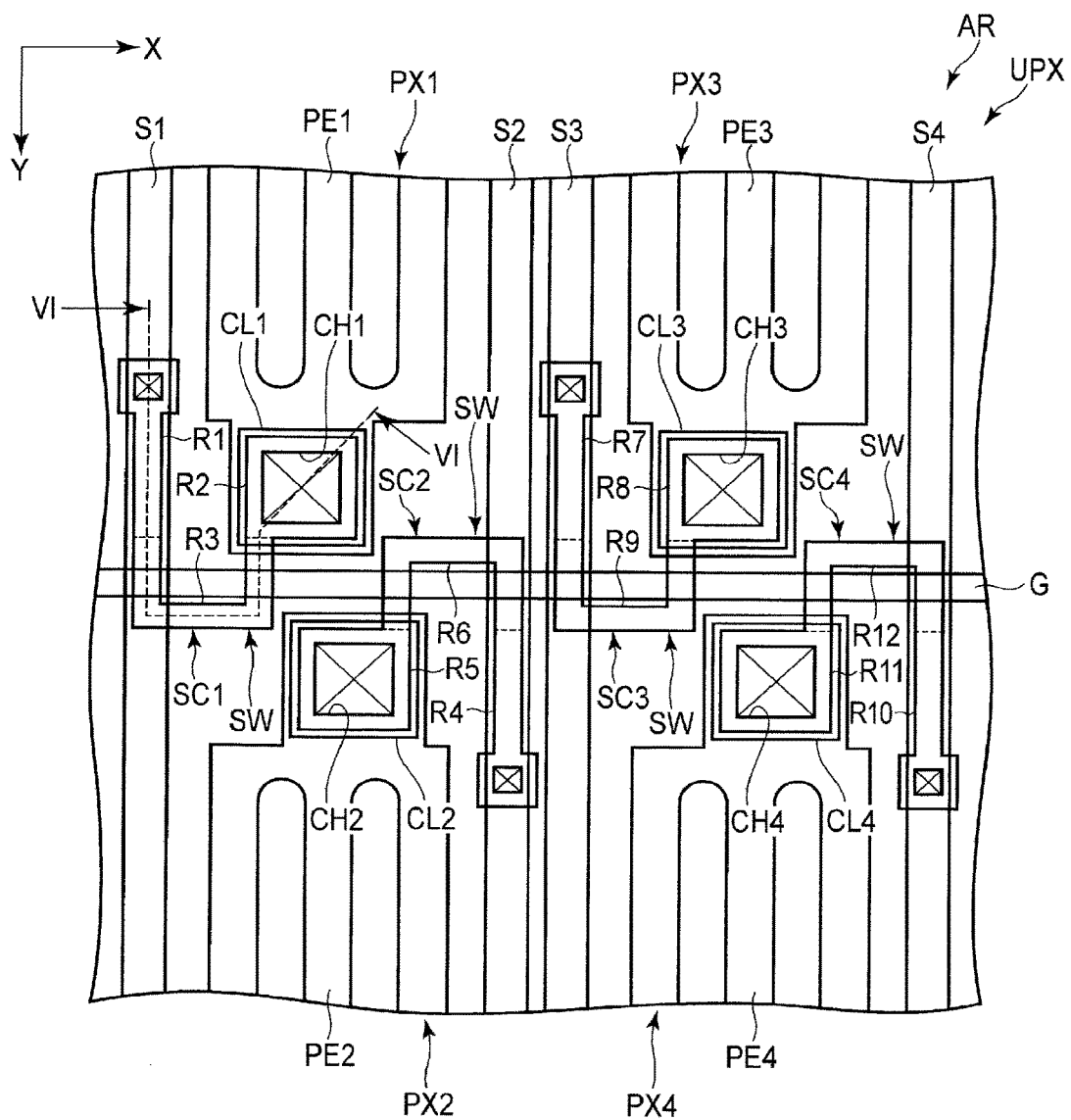
F I G. 5

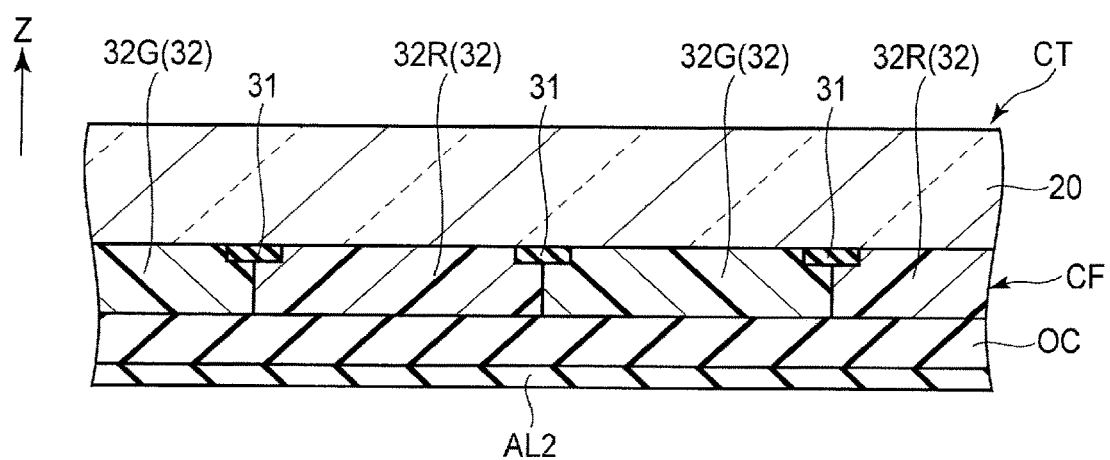
F I G. 7

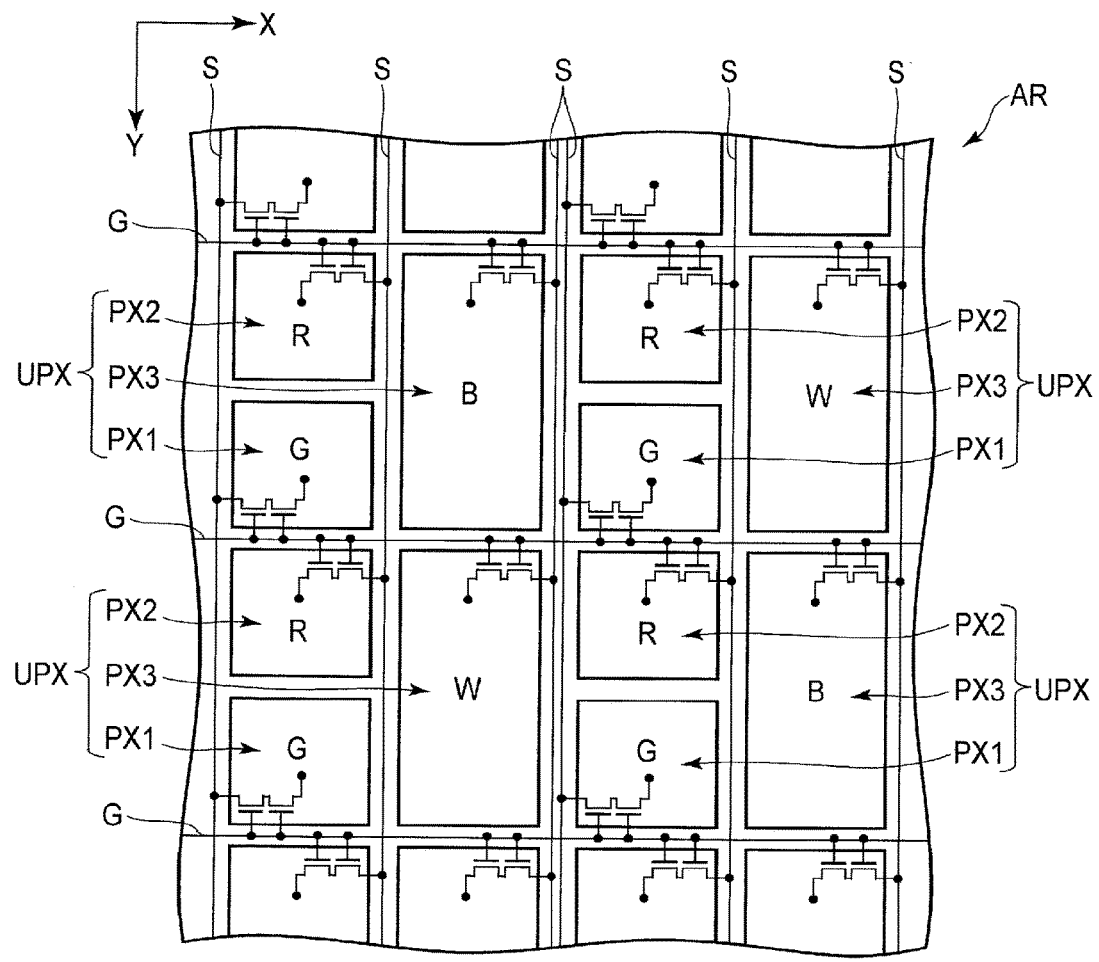
F I G. 8

LIQUID CRYSTAL DISPLAY DEVICE

CROSS-REFERENCE TO RELATED APPLICATIONS

This application is based upon and claims the benefit of priority from Japanese Patent Application No. 2014-219200, filed Oct. 28, 2014, the entire contents of which are incorporated herein by reference.

FIELD

Embodiments described herein relate generally to a liquid crystal display device.

BACKGROUND

With respect to liquid crystal display devices, research has been conducted into making pixels smaller to increase resolution. For example, in two dimensions, a plurality of pixels are arranged in a lattice pattern. Furthermore, as a thin-film transistor, a double-gate thin-film transistor using a branch portion of a scanning line is known.

It should be noted that the smaller the size of a pixel, the greater the ratio of the area of a gate line, of a signal line, and of a contact hole for a pixel electrode to that of the pixel.

BRIEF DESCRIPTION OF THE DRAWINGS

FIG. 2 is a schematic cross-sectional view showing a liquid crystal display panel as shown in FIG. 1.

FIG. 4 is a schematic configuration view showing each of unit pixels in the liquid crystal display panel.

FIG. 5 is a schematic plan view showing part of the array substrate and part of the unit pixel as shown in FIG. 4.

FIG. 7 is a schematic cross-sectional view of a counter-substrate which is taken along line VII-VII in FIG. 4.

FIG. 8 is a schematic configuration view showing four unit pixels in a liquid crystal display panel of a liquid crystal display device according to modification 1 of the above embodiment.

DETAILED DESCRIPTION

Figure 1:
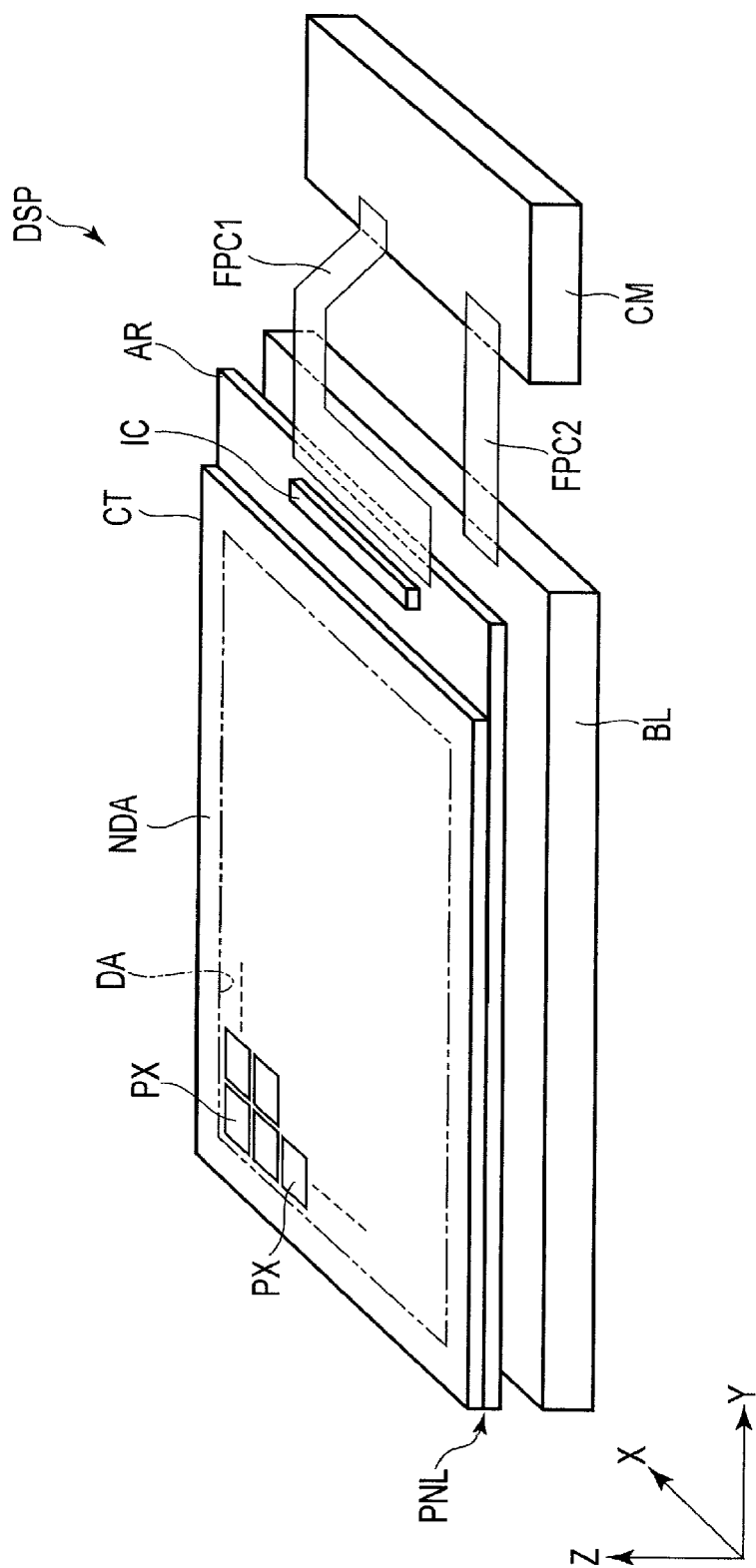
FIG. 1 is a perspective view schematically showing the configuration of a liquid crystal display device according to an embodiment.

In general, according to one embodiment, there is provided a liquid crystal display device comprising: a first substrate; a second substrate located opposite to the first substrate; and a liquid crystal layer held between the first substrate and the second substrate. The first substrate includes: a gate line extending in a first direction; a first signal line extending to intersect the gate line; a second signal line spaced from the first signal line in the first direction, and extending to intersect the gate line; a first semiconductor layer including first to third regions, the first region being connected to the first signal line, the third region being located between the first and second regions, and intersecting the gate line; a second semiconductor layer including fourth to sixth regions, the fourth region being connected to the second signal line, the sixth region being located between the fourth region and the fifth region, and intersecting the gate line; an insulating film provided above the gate line, the first semiconductor layer, the second semiconductor layer, the first signal line and the second signal line; a first contact hole formed in the insulating film, and located in a first pixel area defined by the gate line, the first signal line and the second signal line; a second contact hole formed in the insulating film, and located in a second pixel area and opposite to the first contact hole in a second direction perpendicular to the first direction, the second pixel area being defined by the gate line, the first signal line and the second signal line, and located adjacent to the first pixel area, with the gate line interposed between the first and second pixel areas; a first pixel electrode formed above the insulating film, located in the first pixel area, and electrically connected to the second region through the first contact hole; and a second pixel electrode formed above the insulating film, located in the second pixel area, and electrically connected to the fifth region through the second contact hole.

An embodiment will be described hereinafter with reference to the accompanying drawings. It should be noted that the disclosure is a mere example, and needless to say, arbitrary change of gist which can be easily conceived by a person of ordinary skill in the art naturally falls within the inventive scope. To more clarify explanations, the drawings may pictorially show width, thickness, shape, etc., of each portion as compared with an actual aspect, but they are mere examples and do not restrict the interpretation of the invention. In the present specification and drawings, elements having functions identical or similar to the functions referred to with reference to a previous figure or figures in the drawings will be denoted by the same reference numbers, respectively, as those described with reference to the previous figure or figures and their overlapping detailed descriptions may be arbitrarily omitted.

A liquid crystal display device according to an embodiment will be described in detail. FIG. 1 is a perspective view schematically showing the configuration of the liquid crystal display device. Referring to the figure, a first direction X and a second direction Y are perpendicular to each other. Also, a third direction Z is perpendicular to each of the first direction X and the second direction Y.

As shown in FIG. 1, a liquid crystal display device DSP comprises an active-matrix liquid crystal display panel PNL, a driver IC chip IC which drives the liquid crystal display panel PNL, a backlight unit BL which illuminates the liquid crystal display panel PNL, a control module CM, flexible wiring boards FPC1 and FPC2, etc.

The liquid crystal display panel PNL comprises an array substrate and a counter-substrate CT each formed in the shape of a flat plate and located opposite to each other, with a predetermined gap interposed between them. In the embodiment, the array substrate AR functions as a first substrate, and the counter-substrate CT functions as a second substrate. The liquid crystal display panel PNL includes a display area DA which displays an image and a non-display area NDA which is formed in the shape of a frame in such a way as to surround the display area DA. The liquid crystal display panel PNL comprises a plurality of pixels PX arranged in a matrix in the display area DA to extend in the first direction X and the second direction Y.

The backlight unit BL is provided on a rear surface of the array substrate AR. As the structure of the backlight unit BL, various structures can be applied. However, a detailed explanation of the structure of the backlight unit BL will be omitted.

The driver IC chip IC is mounted on the array substrate AR. The flexible wiring board FPC1 connects the liquid crystal display panel PNL and the control module CM to each other. The flexible wiring board FPC2 connects the backlight unit BL and the control module CM to each other.

FIG. 2 is a schematic view of the cross section of the liquid crystal display panel.

As shown in FIG. 2, the liquid crystal display panel PNL further comprises a sealing member SE, a liquid crystal layer LQ, a first optical element OD1 and a second optical element OD2. The array substrate AR includes a first insulating substrate 10, and the counter-substrate CT includes a second insulating substrate 20.

The sealing member SE is located in the non-display area NDA, and bonds the array substrate AR and the counter-substrate CT to each other. The liquid crystal layer LQ is held between the array substrate AR and the counter-substrate CT, and provided in space surrounded by the array substrate AR, the counter-substrate CT and the sealing member SE.

The first insulating substrate 10 and the second insulating substrate 20 are formed of a transparent insulating material such as glass or an organic material. The first optical element OD1 and the liquid crystal layer LQ are located on opposite sides of the array substrate AR, respectively; that is, they are located opposite to each other with respect to the array substrate AR. The second optical element OD2 and the liquid crystal layer LQ are located on opposite sides of the counter-substrate CT, respectively; that is, they are located opposite to each other with respect to the counter-substrate CT. The first optical element OD1 and the second optical element OD2 each include a polarizer.

Figure 3:
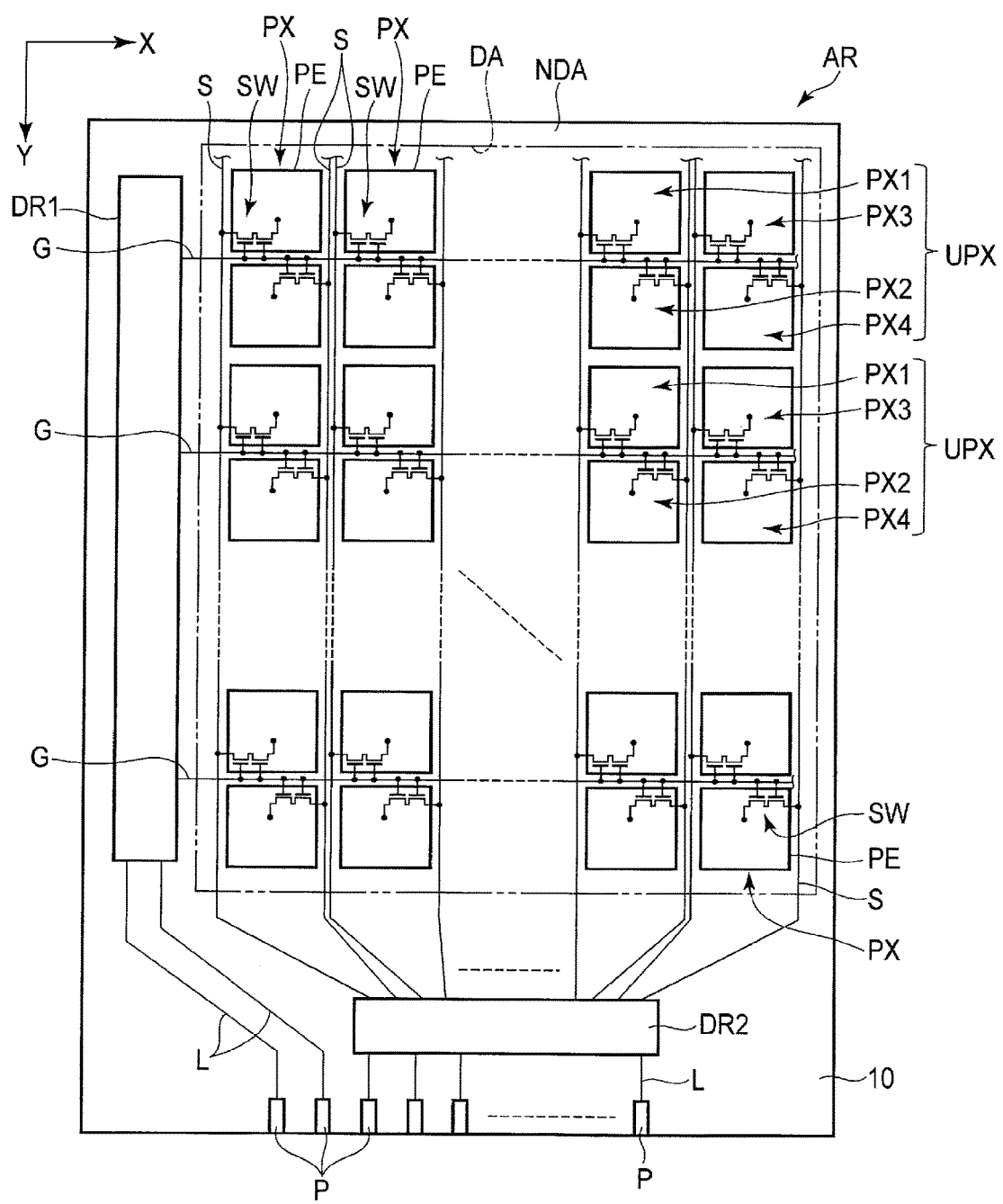
FIG. 3 is a plan view showing a schematic configuration of an array substrate as shown in FIGS. 1 and 2.

FIG. 3 is a plan view schematically showing the configuration of the array substrate AR.

As shown in FIG. 3, the array substrate AR comprises gate lines G, signal lines S, pixel electrodes PE, switching elements SW, a first drive circuit DR1, a second drive circuit DR2, pads P and lead lines L.

In the display area DA, the gate lines G extend in the first direction X, and arranged and spaced from each other in the second direction Y. In the embodiment, the gate lines G linearly extend in the first direction X. Also, in the display area DA, the signal lines S extend in the second direction Y and intersect the gate lines G; and are arranged and spaced from each other in the first direction X. It should be noted that the signal lines S need not always linearly extend; i.e., they may be partially bent or be inclined with respect to the second direction Y. The pixel electrodes PE are located in association with the pixels PX. That is, the pixel electrodes PE are arranged in a matrix in the first direction X and the second direction Y. The switching element SW electrically connects the pixel electrode PE and the signal line S. The switching element is formed of, for example, thin-film transistor (TFT). The first drive circuit DR1 and the second drive circuit DR2 are located in the non-display area NDA. The first drive circuit DR1 is electrically connected to portions of the gate lines G which are located in the non-display area NDA. The second drive circuit DR2 is electrically connected to portions of the signal lines S which are located in the non-display area NDA. The pads P are provided at an end portion of the array substrate AR which is one of end portions thereof in the second direction Y. The lead lines L electrically connect, in the non-display area NDA, the first drive circuit DR1 and the pads P, and also the second drive circuit DR2 and the pads P.

The first drive circuit DR1 supplies a control signal to the gate lines G. The second drive circuit DR2 supplies an image signal (for example, a video signal) to the signal lines S. The pads P electrically connect the first drive circuit DR1 and the second drive circuit DR2 to the control module as shown in FIG. 1.

In the embodiment, the pixels PX are classified into four kinds of pixels, i.e., first pixels PX1, second pixels PX2, third pixels PX3 and fourth pixels PX4. To be more specific, a second pixel PX2 is adjacent to a first pixel PX1 in the second direction Y. A third pixel PX3 is adjacent to the first pixel PX1 in the first direction X. The fourth pixel PX4 is adjacent to the second pixel PX2 in the first direction X, and adjacent to the third pixel PX3 in the second direction Y. Those adjacent four pixels PX, i.e., the first pixel PX1, the second pixel PX2, the third pixel PX3 and the fourth pixel PX4, form a unit pixel UPX. A plurality of unit pixels UPX are arranged in a matrix in the first direction X and the second direction Y.

It should be noted that the unit pixels UPX can be translated into picture elements or main pixels. Alternatively, the unit pixels UPX can be translated into pixels. In this case, the above pixels PX can be translated into sub-pixels.

FIG. 4 is a view schematically showing the configuration of a single unit pixel UPX in the liquid crystal display panel PNL. FIG. 4 also shows a single gate line G to be used by the unit pixel UPX and four signal lines S1 to S4.

As shown in FIG. 4, the liquid crystal display panel PNL includes a plurality of first to fourth pixel areas PR1 and PR4, and to be more specific, each of the unit pixels UPX is associated with first to fourth pixel areas RP1 and RP4.

The first pixel area RP1 is defined by the gate line G, a first signal line S1 and a second signal line S2. Roughly speaking, the first pixel PX1 is located in the first pixel area RP1.

The second pixel area RP2 is defined by the gate line G, the first signal line S1 and the second signal line S2, and located adjacent to the first pixel area RP1, with the gate line G interposed between the second pixel area RP2 and the first pixel area RP1. Roughly speaking, the second pixel PX2 is located in the second pixel area RP2.

The third pixel area RP3 is defined by the gate line G, a third signal line S3 and a fourth signal line S4, and located adjacent to the first pixel area RP1, with the second signal line S2 and the third signal line S3 interposed between the third pixel area RP3 and the first pixel area RP1. Roughly speaking, the third pixel PX3 is located in the third pixel area RP3.

The fourth pixel area RP4 is defined by the gate line G, the third signal line S3 and the fourth signal line S4, and located adjacent to the third pixel area RP3, with the gate line G interposed between the fourth pixel area RP4 and the third pixel area RP3, and adjacent to the second pixel area RP2, with the second signal line S2 and the third signal line S3 interposed between the fourth pixel area RP4 and the second pixel area PR2.

The first to fourth pixels PX1 to PX4 are respective pixels for different colors. In the embodiment, the first pixel PX1 is a red (R) pixel, the second pixel PX2 is a blue (B) pixel, the third pixel PX3 is a green (G) pixel, and the fourth pixel PX4 is a white (W) pixel.

Furthermore, in the embodiment, the unit pixel UPX is substantially square, and the first to fourth pixels PX1 to PX4 are arranged in a substantially square.

It should be noted that the shape of the unit pixel UPX is not limited to square, and for example, the unit pixel UPX may be rectangular. For example, the first pixel PX1, the second pixel PX2, the third pixel PX3 and the fourth pixel PX4 may be formed as a green (G) pixel, a blue (B) pixel, a red (R) pixel and a white (W) pixel, respectively; the dimension of each of the second pixel PX2 and the fourth pixel PX4 in the second direction Y may be set greater than that of each of the first pixel PX1 and the third pixel PX3 in the second direction Y; and the dimension of each of the third pixel PX3 and the fourth pixel PX4 in the first direction may be set greater than that of each of the first pixel PX1 and the second pixel PX2 in the first direction X.

FIG. 5 is a schematic plan view showing part of the array substrate AR, and also showing part of the single unit pixel UPX as shown in FIG. 4.

As shown in FIG. 5, the array substrate AR comprises gate lines G, a first signal line S1, a second signal line S2, a third signal line S3, a fourth signal line S4, a first pixel electrode PE1, a second pixel electrode PE2, a third pixel electrode PE3, a fourth pixel electrode PE4, a first semiconductor layer SC1, a second semiconductor layer SC2, a third semiconductor layer SC3, a fourth semiconductor layer SC4, a first conductive layer CL1, a second conductive layer CL2, a third conductive layer CL3 and a fourth conductive layer CL4.

The first semiconductor layer SC1 includes a first region R1 connected to the first signal line S1, a second region R2 and a third region R3. The third region R3 is located between the first region R1 and the second region R2, and intersects a gate line G.

The second semiconductor layer SC2 includes a fourth region R4 connected to the second signal line S2, a fifth region R5 and a sixth region R6. The sixth region R6 is located between the fourth region R4 and the fifth region R5, and intersects the gate line G.

The third semiconductor layer SC3 includes a seventh region R7 connected to the third signal line S3, an eighth region R8 and a ninth region R9. The ninth region R9 is located between the seventh region R7 and the eighth region R8, and intersects the gate line G.

The fourth semiconductor layer SC4 includes a tenth region R10 connected to the fourth signal line S4, an eleventh region R11 and a twelfth region R12. The twelfth region R12 is located between the tenth region R10 and the eleventh region R11, and intersects the gate line G.

In the embodiment, as seen from above, in the X-Y plane, the first pixel area RP1 and the third pixel area RP3 are located on an upper side, the second pixel area RP2 and the fourth pixel area RP4 are located on a lower side, the third and ninth regions R3 and R9 are each U-shaped, and each intersect the gate line G in two positions, and the sixth and twelfth regions R6 and R12 are each formed in an inverted U-shape, and each intersect the gate line G in two positions. Thus, as each of the switching elements SW, a double-gate TFT is used. Furthermore, the third, sixth, ninth and twelfth regions R3, R6, R9 and R12 intersect the gate line G at right angles.

The first conductive layer CL1 is located in the first pixel area RP1, and opposite to the second region R2 in the third direction Z, and is electrically connected to the second region R2.

The second conductive layer CL2 is located in the second pixel area RP2, and opposite to the fifth region R5 in the third direction Z, and is electrically connected to the fifth region R5.

The third conductive layer CL3 is located in the third pixel area RP3, and opposite to the eighth region R8 in the third direction Z, and is electrically connected to the eighth region R8.

The fourth conductive layer CL4 is located in the fourth pixel area RP4, and opposite to the eleventh region R11 in the third direction Z, and is electrically connected to the eleventh region R11.

The first pixel electrode PE1 is located in the first pixel area RP1, extends through a first contact hole CH1 located in the first pixel area RP1 to contact the first conductive layer CL1, and is electrically connected to the second region R2.

The second pixel electrode PE2 is located in the second pixel area RP2, extends through a second contact hole CH2 located in the second pixel area RP2 to contact the second conductive layer CL2, and is electrically connected to the fifth region R5.

The third pixel electrode PE3 is located in the third pixel area RP3, and extends through a third contact hole CH3 located in the third pixel area RP3 to contact the third conductive layer CL3, and is electrically connected to the eighth region R8.

The fourth pixel electrode PE4 is located in the fourth pixel area RP4, extends through a contact hole CH4 located in the fourth pixel area RP4 to the fourth conductive layer CL4, and is electrically connected to the eleventh region R11.

It should be noted that the liquid crystal display panel PNL according to the embodiment has a structure adapted for a fringe field switching (FFS) mode applied as a display mode. Thus, the first to fourth pixel electrodes PE1 to PE4 each include a slit.

Also, it should be noted that at least part of the second contact hole CH2 is located opposite to the first contact hole CH1 in the second direction Y. At least part of the fourth contact hole CH4 is located opposite to the third contact hole CH3 in the second direction Y.

Figure 6:
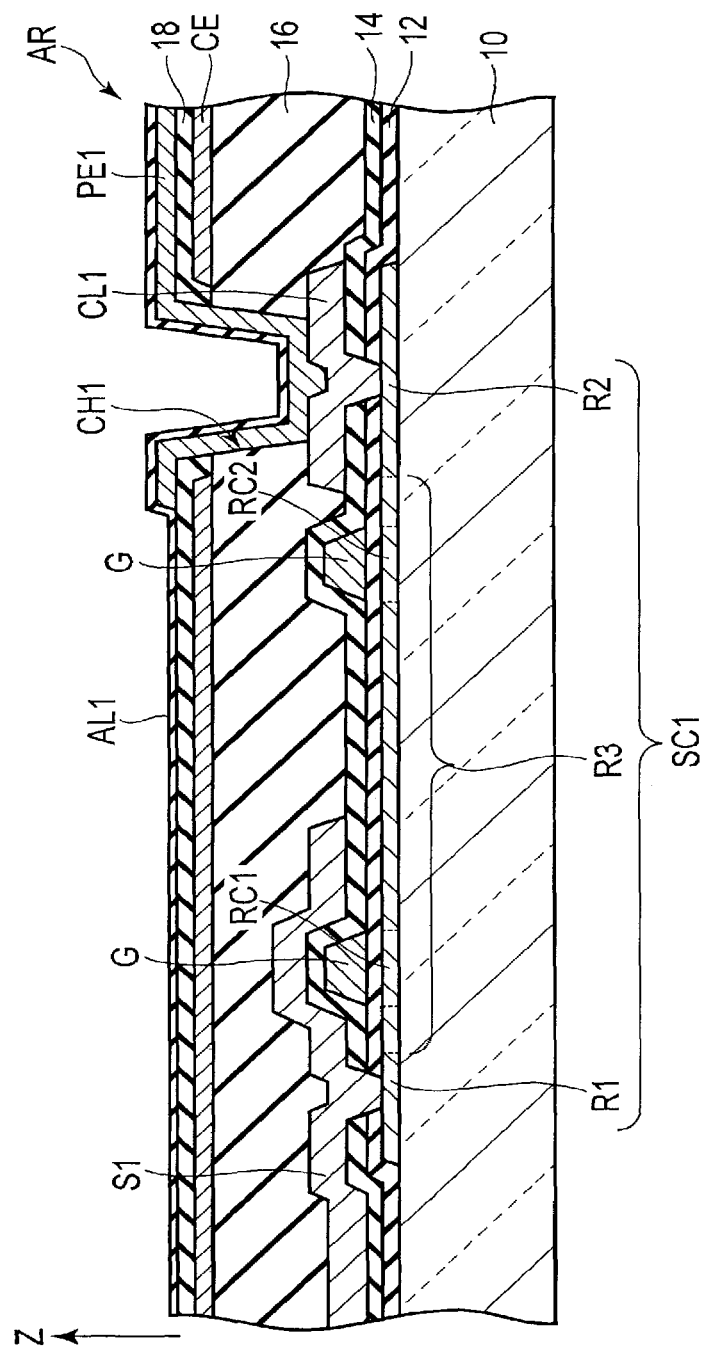
FIG. 6 is a schematic cross-sectional view of the array substrate which is taken along line VI-VI in FIG. 5.

FIG. 6 is a schematic cross-sectional view of the array substrate which is taken along line VI-VI in FIG. 5.

As shown in FIG. 6, semiconductor layers, i.e., the first semiconductor layer SC1, etc., are formed on the first insulating substrate 10. Those semiconductor layers are formed of low-temperature polycrystalline silicon (LTPS), but they may be formed of amorphous silicon (a-Si) or oxide semiconductor or the like. As the oxide semiconductor to be applied to the semiconductor layers, an oxide containing at least one of indium, gallium and zinc is preferable. Typical examples of the oxide semiconductor are indium gallium zinc oxygen (InGaZnO), indium gallium zinc oxide (IGZO), indium gallium oxide (IGO), indium zinc oxide (IZO), zinc tin oxide (ZnSnO), zinc oxide (ZnO), etc.

The third region R3 of the first semiconductor layer SC1 includes a first counter region RC1 and a second counter region RC2 which are located opposite to respective gate line G. In the embodiment, the first counter region RC1 and the second counter region RC2 are respective channel regions.

A first insulating film 12 is formed on the first insulating substrate 10 and the first semiconductor layer SC1 (semiconductor layer). The gate line G is formed on the first insulating film 12 and opposite to the first counter region RC1 and the second counter region RC2. A second insulating film 14 is formed on the gate line G and the first insulating film 12.

Signal lines such as the first signal line S1 and conductive layers such as the first conductive layer CL1 are formed on the second insulating film 14. The first signal line S1 is in contact with the first region R1 of the first semiconductor layer SC1 through a contact hole formed in the first insulating film 12 and the second insulating film 14. The first conductive layer CL1 is in contact with the second region R2 of the first semiconductor layer SC1 through another contact hole formed in the first insulating film 12 and the second insulating film 14.

A third insulating film 16 is formed on the second insulating film 14, the first signal line S1 and the first conductive layer CL1. Also, the third insulating film 16 is located above the gate line G, the first semiconductor layer SC1 (semiconductor layer) and the first signal line S1 (signal line). The third insulating film 16 serves to cover irregularities of the array substrate AR in order for the array substrate AR to have a flat surface. Thus, the third insulating film 16 is formed of an organic material such as acrylic resin, which allows it to be thicker. In the third insulating film 16, a plurality of contact holes such as the first contact hole CH1 are formed. The first contact hole CH1 is located to extend from an upper location than the first conductive layer CL1 to reach and expose the first conductive layer CL1.

A common electrode CE is formed on the third insulating film 16. The common electrode CE includes a plurality of openings which surround the contact holes such as the first contact hole CH1. A fourth insulating film 18 is formed on the third insulating film 16 and the common electrode CE. The first insulating film 12, the second insulating film 14 and the fourth insulating film 18 are formed of an inorganic material, for example, silicon nitride (SiN) or silicon oxide (SiO).

Pixel electrodes such as the first pixel electrode PE1 are formed on the fourth insulating film 18. Also, the pixel electrodes such as the first pixel electrode PE1 are located above the third insulating film 16. The first pixel electrode PE1 is in contact with the first conductive layer CL1 through the first contact hole CH1. It should be noted that the first pixel electrode PE1 extends through not only the first contact hole CH1, but another contact hole which is formed in the fourth insulating film 18 and located opposite to the first contact hole CH1. The first pixel electrode PE1 is located opposite to the common electrode CE in the third direction Z. The common electrode CE and the first pixel electrode PE1 (pixel electrode) are formed of a transparent conductive material such as indium zinc oxide (IZO) or indium tin oxide (ITO).

An alignment film AL is formed on the fourth insulating film 18 and the pixel electrodes PE. The alignment film AL1 is formed of, for example, a material exhibiting a horizontal alignment property. The alignment film AL1 is a film subjected to alignment treatment.

FIG. 7 is a schematic cross-sectional view of the counter-substrate CT which is taken along line VII-VII in FIG. 4. As shown in FIG. 7, the counter-substrate CT comprises the second insulating substrate 20, a color filter CF, an overcoat layer OC and an alignment film AL2.

The color filter CF includes a light-shielding layer 31. The light-shielding layer 31 is formed on the second insulating substrate 20. The light-shielding layer 31 is formed of a material having a low light transmittance and a low reflectivity. The light-shielding layer 31 is formed to have portions arranged at least in the manner of stripes, extend in the first direction X, and located opposite to the gate lines G. In the embodiment, the light-shielding layer 31 is formed in the shape of a lattice, and located opposite to the gate lines G and also to the signal lines S.

The color filter CF includes colored layers 32 having different colors (or transparent layers). In the embodiment, the color filter CF includes a plurality of colored layers, i.e., red layers 32 (32R) provided in regions corresponding to the first pixels PX1, blue layers 32 provided in regions corresponding to the second pixels PX2, green layers 32 (32G) provided in regions corresponding to the third pixels PX3, and transparent layers 32 provided in regions corresponding to the fourth pixels PX4.

The red layers 32R are formed of red-colored resin. The blue layers 32 are formed of blue-colored resin. The green layers 32G are formed of green-colored resin. The transparent layers 32 are formed of transparent resin.

It should be noted that the transparent layers 32 may be faintly colored to such an extent not to adversely affect a displayed image. Alternatively, the color filter 30 can be formed without the transparent layers 32.

The overcoat layer OC is formed of a transparent resin material and provided on the color filter CF. The overcoat layer OC can reduce the irregularities of a surface of the counter-substrate CT. It suffices that the overcoat layer OC is designed as occasion demands.

The alignment film AL2 is formed on the overcoat layer OC. The alignment film AL1 is formed of, for example, a material exhibiting a horizontal alignment property. The alignment film AL2 is a film subjected to alignment treatment.

In the embodiment, the liquid crystal display device having the above structure comprises the array substrate AR, the counter-substrate CT and the liquid crystal layer LQ. The array substrate AR comprises the gate lines G, the signal lines S (S1 to S4), the semiconductor layers SC (SC1 to SC4), the third insulating film 16, the contact holes CH (CH1 to CH4), and the pixel electrodes PE (PE1 to PE4).

The gate lines G extend in the first direction. The gate lines G are formed so as not to project from their side edges in the second direction Y. This can thus contribute to improvement of the aperture ratios of the pixels PX, as compared with the case of using gate lines provided with projection portions.

The first to fourth pixels PX1 to PX4 forming a unit pixel UPX share a gate line G with each other. A group of first and third contact holes CH1 to CH3 and a group of second and fourth contact holes CH2 and CH4 are located, with a gate line G interposed between those groups. In each of the groups, the number of contact holes arranged in the first direction X is two. That is, in the unit pixel UPX, the number of contact holes arranged in the first direction X is two.

By virtue of the above structure, in the embodiment, the unit pixels UPX can be arranged at a small pitch, as compared with unit pixels in each of which three or more contact holes are arranged in the first direction X. This feature can thus reduce the sizes of the pixels PX, and contribute to the achievement of a higher resolution.

This is because in the case where contract holes are arranged in the first direction X, they need to be at a specific pitch or higher. Therefore, the smaller the number of contact holes arranged in the first direction X, the more easily the above advantage can be obtained (in the embodiment, the advantage can be easily obtained since the number of contact holes arranged in the first direction X is small).

Furthermore, in the embodiment, at least part of the second contact hole CH2 is located opposite to the first contact hole CH1 in the second direction Y. Similarly, at least part of the fourth contact hole CH4 is located opposite to the third contact hole CH3 in the second direction Y. Accordingly, the pixels PX can be arranged at a smaller pitch in the first direction X, and can thus be made smaller, thus contributing to the achievement of a higher resolution.

It should be noted that in order to obtain the above advantage, in the embodiment, the first semiconductor layer SC1 and the second semiconductor layer SC2 are formed symmetrically with respect to a point, and similarly, the third semiconductor layer SC3 and the fourth semiconductor layer SC4 are formed symmetrically with respect to a point.

This can reduce the total width of the first semiconductor layer SC1 and the second semiconductor layer SC2 in the first direction X and the total width of the third semiconductor layer SC3 and the fourth semiconductor layer SC4 in the first direction X. It also enables the first semiconductor layer SC1 and the second semiconductor layer SC2 to be located opposite to each other in the second direction Y, and the first semiconductor layer SC1 and the second semiconductor layer SC2 to be located opposite to each other in the second direction Y.

By virtue of the above structural features, according to the embodiment, it is possible to obtain a liquid crystal display device which can achieve a higher resolution. Alternatively, it is possible to obtain a liquid crystal display device which can have a higher aperture ratio.

Next, a liquid crystal display device according to modification 1 of the above embodiment will be described. The liquid crystal display device according to modification 1 is different from that according to the above embodiment with respect to the configuration of unit pixels UPX, the relationship in connection between the unit pixels UPX and gate lines G and the relationship in connection between the unit pixels UPX and signal lines S. FIG. 8 is a schematic configuration view showing each of four unit pixels UPX in a liquid crystal display panel PNL of the liquid crystal display device according to modification 1.

As shown in FIG. 8, a plurality of unit pixels UPX are arranged in a matrix in the first direction X and the second direction Y. Each of the unit pixels UPX comprises a first pixel PX1, a second pixel PX2 which is located adjacent to the first pixel PX1 in the second direction Y, and a third pixel PX3 which is located adjacent to both the first pixel PX1 and the second pixel PX2 in the first direction X. In the X-Y plane, the sizes of the first to third pixels PX1 to PX3 (first to third pixel electrodes PE1 to PE3) are not specifically limited. For example, the size of the third pixel PX3 (the third pixel electrode PE3) may be equivalent to the total size of the first pixel PX1 (the first pixel electrode PE1) and the second pixel PX2 (the second pixel electrode PE2).

In modification 1, the first pixel PX1 is a green (G) pixel, the second pixel PX2 is a red (R) pixel, and the third pixel PX3 is a blue (B) or white (W) pixel. Colored layers and transparent layers of the color filter CF are arranged in association with the first to third pixels PX1 to PX3. Unit pixels UPX including third pixels PX3 provided as blue pixels and unit pixels UPX including third pixels PX3 provided as white pixels are arranged in a checkered pattern.

A plurality of third pixels PX3 arranged in the second direction Y share a single signal line S (a third signal line S3 to be described later).

Figure 9:
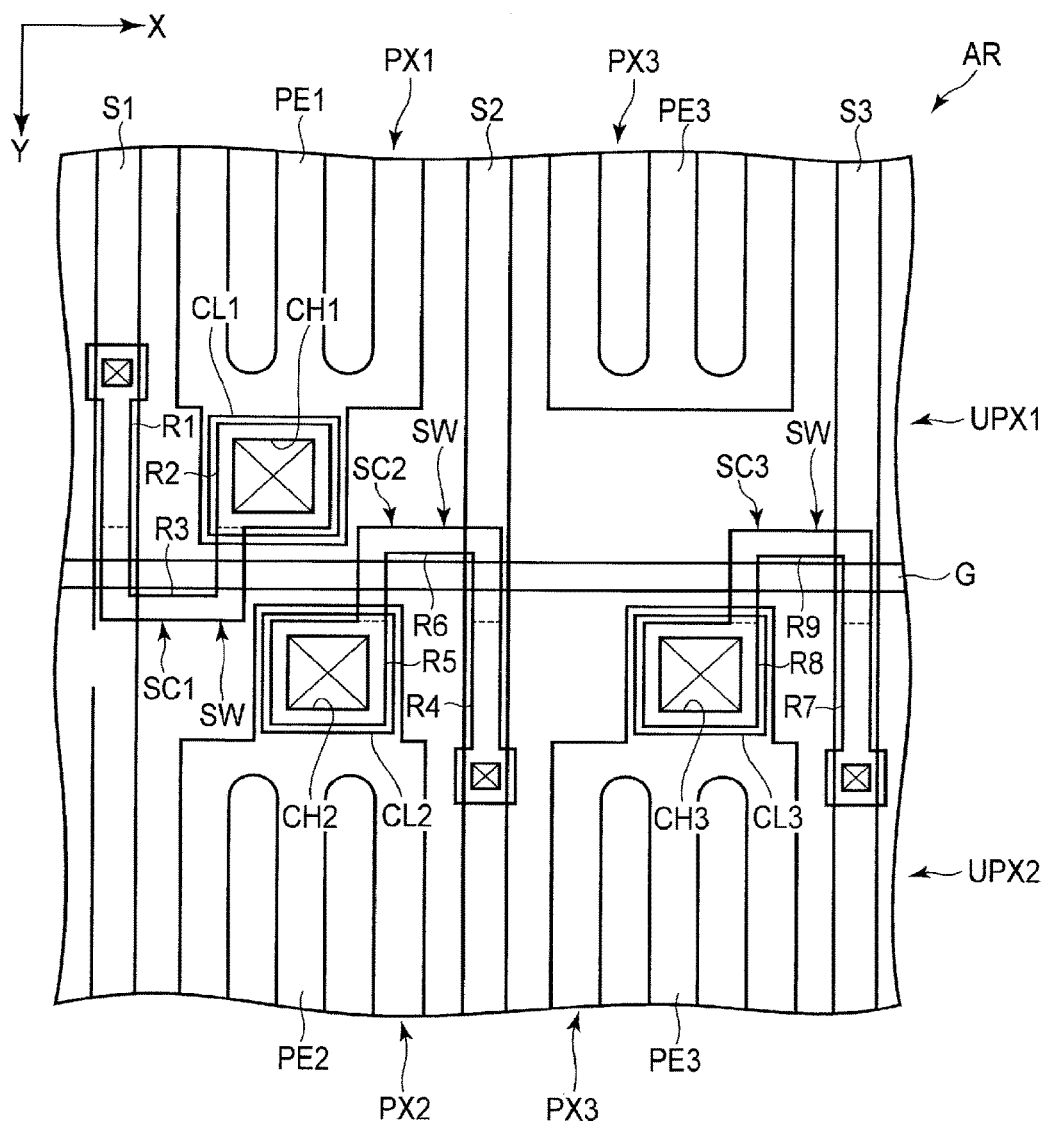
FIG. 9 is a view showing part of an array substrate in modification 1 and part of two unit pixels as shown in FIG. 8.

FIG. 9 is a schematic plan view showing part of an array substrate AR in modification 1, and also showing part of two unit pixels UPX as shown in FIG. 8.

As shown in FIG. 9, of the unit pixels UPX, two unit pixels UPX which are located between first and third signal lines S1 and S3 and adjacent to each other, with a gate line G interposed between those two unit pixels UPX, will be referred to as a first unit pixel UPX1 and a second unit pixel UPX2, respectively. To the first unit pixel UPX1 and the second unit pixel UPX2, three signal lines, i.e., the first signal line S1, the second signal line S2 and the third signal line S3, are connected.

First pixel PX1 of the first unit pixel UPX1 includes a first semiconductor layer SC1 and a first pixel electrode PE1. Second pixel PX2 of the second unit pixel UPX2 includes a second semiconductor layer SC2 and a second pixel electrode PE2. Third pixel PX3 of the second unit pixel UPX2 includes a third semiconductor layer SC3 and a third pixel electrode PE3.

First pixel PX1 of the first unit pixel UPX1, second pixel PX2 of the second unit pixel UPX2 and one of third pixel PX3 of the first unit pixel UPX1 and third pixel PX3 of the second unit pixel UPX2 share one gate line G. In modification 1, first pixel PX1 of the first unit pixel UPX1, second pixel PX2 of the second unit pixel UPX2 and third pixel PX3 of the second unit pixel UPX2 share one gate line G.

At least part of a second contact hole CH2 in second pixel PX2 of the second unit pixel UPX2 is located opposite to a first contact hole CH1 in first pixel PX1 of the first unit pixel UPX1 in the second direction Y. Furthermore, in modification 1, in each of the unit pixels UPX, the number of contact holes arranged in the first direction X is two at maximum.

By virtue of the above structure, modification 1 can also obtain the same advantage as the above embodiment. In addition, the areas of blue pixels having a low luminosity factor may be made larger than those of red pixels or those of green pixels, thereby improving the display quality of the liquid crystal display device.

Figure 10:
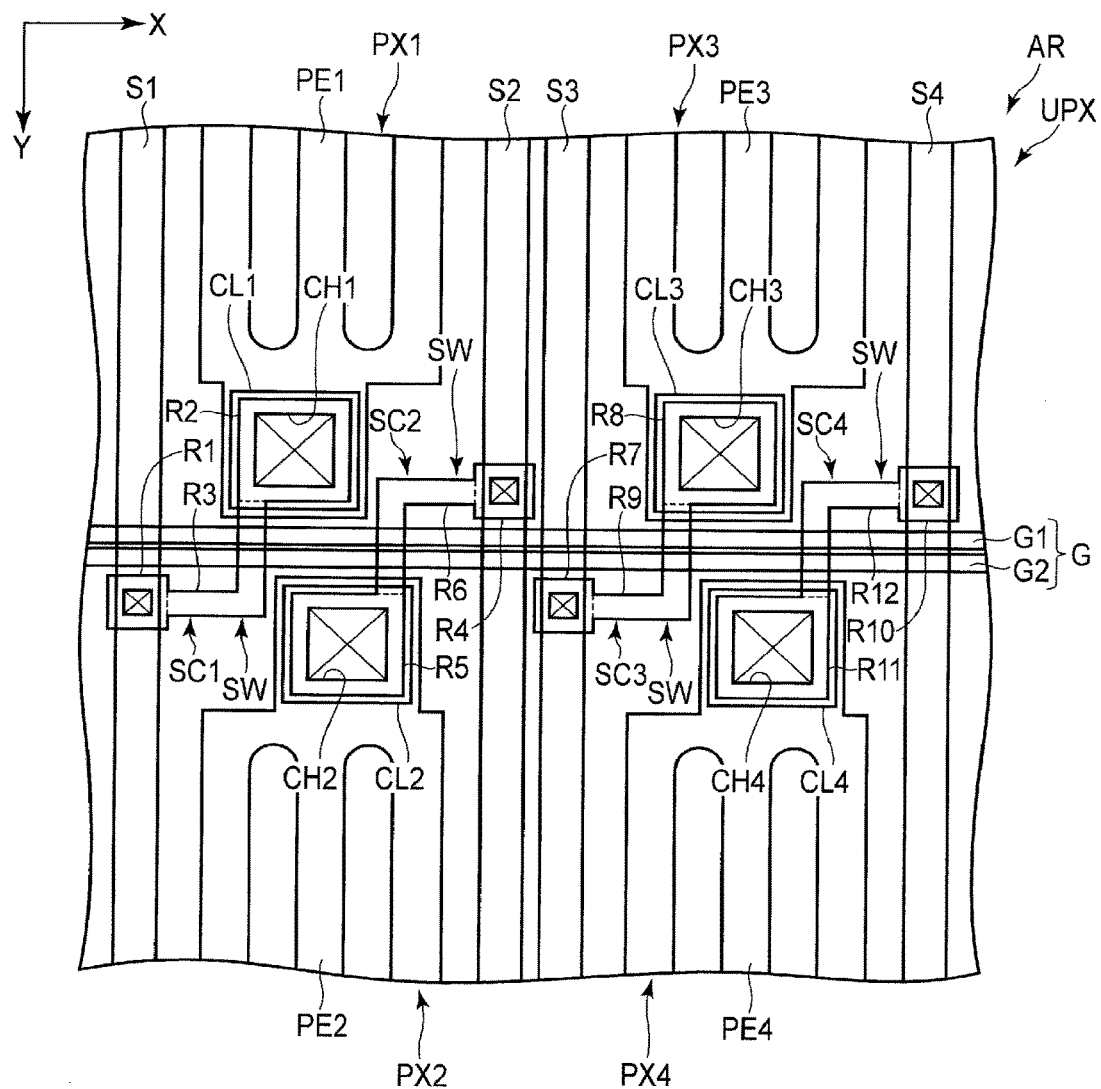
FIG. 10 is a schematic plan view showing part of an array substrate in modification 2 and part of a single unit pixel.

Next, a liquid crystal display device according to modification 2 of the above embodiment will be described. The liquid crystal display device according to modification 2 is different from that according to the embodiment with respect to the configuration of gate lines G and that of semiconductor layers SC. FIG. 10 is a schematic plan view showing part of an array substrate AR in the liquid crystal display device according to modification 2, and also showing part of a single unit pixel UPX.

As shown in FIG. 10, gate line G includes gate lines G1 and G2, and the gate lines G1 and G2 are arranged and spaced from each other in the second direction Y and extending in parallel with each other in the first direction X. The first gate line G1 and the second gate line G2 of the gate line G are electrically connected to each other. For example, the first gate line G1 and the second gate line G2 linearly extend in the first direction X.

A third region R3 of a first semiconductor layer SC1, a sixth region R6 of a second semiconductor layer SC2, a ninth region R9 of a third semiconductor layer SC3 and a twelfth region R12 of a fourth semiconductor layer SC4 intersect the first gate line G1 and the second gate line G2.

In modification 2, as seen from above, in the X-Y plane, first pixels PX1 and third pixels PX3 are located on an upper side, second pixels PX2 and fourth pixels PX4 are located on a lower side, the third region R3 and the ninth region R9 are each formed in a laterally inverted L-shape, and the sixth region R6 and the twelfth region R12 are formed in an inverted L-shape. Thus, in modification 2 also, as each of the switching elements SW, a double-gate TFT is used. Furthermore, the third, sixth, ninth and twelfth regions R3, R6, R9 and R12 intersect the first gate line G1 and the second gate line G2 at right angles.

By virtue of the above structure, modification 2 can also obtain the same advantage as the above embodiment.

Furthermore, as shown in FIG. 10, in modification 2, the first semiconductor layer SC1 and the second semiconductor layer SC2 are formed symmetric with respect to a point, and located opposite to each other in the second direction Y. Similarly, the third semiconductor layer SC3 and the fourth semiconductor layer SC4 are formed symmetric with respect to a point, and located opposite to each other in the second direction Y. It is therefore possible to reduce the pitch at which the pixels PX are arranged in the first direction X, and contribute to achievement of a higher resolution.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of each of the pixels PX and colors of the color filter CF which are associated with the pixels PX are not limited to those referred to above with respect to the above embodiment and the modifications. They can be variously changed.

As the above switching elements SW, not top-gate TFTs but bottom-gate TFTs may be used.

Also, as the switching elements SW, single-gate TFTs may be used in place of the double-gate TFTs.

The above embodiment is not limited to the above liquid crystal display devices; that is, it can be applied to various liquid crystal display devices. Needless to say, the above embodiment can be applied to middle or small display devices and large display devices without particular limitation.

For example, the liquid crystal display panel PNL in the above embodiment has a structure adapted for the FFS mode used as a display mode; however, it may have a structure adapted for another display mode. For example, the liquid crystal display panel PNL may have a structure adapted for an in-plane switching (IPS) mode such as an FFS mode, which primarily utilizes a lateral electric field substantially parallel to a main surface of a substrate. In a display mode utilizing a lateral electric field, it is possible to apply a structure including, for example, an array substrate AR provided with pixel electrodes PE and a common electrode CE. Alternatively, a liquid crystal display panel PNL may have a structure adapted for a mode primarily utilizing a longitudinal electric field substantially perpendicular to the main surface of the substrate, such as a twisted nematic (TN) mode, an optically compensated bend (OCB) mode or a vertical aligned (VA) mode. In the display mode utilizing the longitudinal electric field, for example, it is possible to apply a structure including an array substrate AR provided with pixel electrodes PE and a counter-substrate CT provided with a common electrode CE. It should be noted that the above main surface of the substrate is a surface parallel to the X-Y plane defined in the first direction X and the second direction Y which intersect each other.

What is claimed is:

1. A liquid crystal display device comprising a first substrate, a second substrate located opposite to the first substrate, and a liquid crystal layer held between the first substrate and the second substrate,
wherein the first substrate comprises:
a gate line extending in a first direction;
a first signal line extending to intersect the gate line;
a second signal line spaced from the first signal line in the first direction, and extending to intersect the gate line;
a first semiconductor layer including first to third regions, the first region being connected to the first signal line, the third region being located between the first and second regions, and intersecting the gate line;
a second semiconductor layer including fourth to sixth regions, the fourth region being connected to the second signal line, the sixth region being located between the fourth region and the fifth region, and intersecting the gate line;
a first insulating film directly provided on the first semiconductor layer and the second semiconductor layer,
a second insulating film directly provided on the first insulating film, the first signal line and the second signal line;
a first contact hole formed in the second insulating film, and located in a first pixel area defined by the gate line, the first signal line and the second signal line;
a second contact hole formed in the second insulating film, located in a second pixel area and opposite to a part of the first contact hole in a second direction perpendicular to the first direction, the second contact hole being displaced from the first contact hole in the first direction, the second pixel area being defined by the gate line, the first signal line and the second signal line, and located adjacent to the first pixel area, with the gate line interposed between the first and second pixel areas;
a fifth contact hole formed in the first insulating film and located in the same position as the first contact hole, in a plan view;
a sixth contact hole formed in the first insulating film and located in the same position as the second contact hole, in the plan view;
a first conductive layer independently formed in the same layer as the first signal line, located in the first pixel area and electrically connected to the second region through the fifth contact hole;
a second conductive layer independently formed in the same layer as the second signal line, located in the second pixel area and electrically connected to the fifth region through the sixth contact hole;
a first pixel electrode formed above the second insulating film, located in the first pixel area, and electrically connected to the first conductive layer through the first contact hole; and
a second pixel electrode formed above the second insulating film, located in the second pixel area, and electrically connected to the second conductive layer through the second contact hole,
in the second pixel area, the third region and the second contact hole are arranged in the first direction, and
in the first pixel area, the sixth region and the first contact hole are arranged in the first direction.

2. The liquid crystal display device of claim 1, wherein the third region and the sixth region intersect the gate line at right angles.

3. The liquid crystal display device of claim 1, wherein the first substrate further comprises:
a third signal line spaced from the second signal line in the first direction, and extending to intersect the gate line;
a fourth signal line spaced from the third signal line in the first direction, and extending to intersect the gate line;

a third semiconductor layer including a seventh region connected to the third signal line, an eighth region, and a ninth region located between the seventh region and the eighth region and intersecting the gate line;
a fourth semiconductor layer including a tenth region connected to the fourth signal line, an eleventh region, and a twelfth region located between the tenth region and the eleventh region and intersecting the gate line;
a third contact hole;
a fourth contact hole;
a third pixel electrode; and
a fourth pixel electrode,
the first insulating film is provided on the third semiconductor layer and the fourth semiconductor layer, the second insulating film is provided on the third signal line and the fourth signal line,
the third contact hole is formed in the second insulating film, defined by the gate line and the third and fourth signal lines, and located in a third pixel area which is located adjacent to the first pixel area, with the second and third signal lines interposed between the third pixel area and the first pixel area,
the fourth contact hole is formed in the second insulating film, defined by the gate line and the third and fourth signal lines, and located in a fourth pixel area which is located adjacent to the third pixel area, with the gate line interposed between the fourth and third pixel areas, and which is also located adjacent to the second pixel area, with the second and third signal lines interposed between the fourth and second pixel area,
the third pixel electrode is provided above the second insulating film, located in the third pixel area, and electrically connected to the eighth region through the third contact hole, and
the fourth pixel electrode is formed above the second insulating film, located in the fourth pixel area, and electrically connected to the eleventh region through the fourth contact hole.

4. The liquid crystal display device of claim 1, wherein the first substrate further comprises:
a plurality of unit pixels each including a first pixel, a second pixel located adjacent to the first pixel in the second direction and a third pixel located adjacent to both the first pixel and second pixel in the first direction, the unit pixels being arranged in a matrix in the first direction and the second direction; and
a third signal spaced from the second signal line in the first direction, and extending to intersect the gate line, and
in first and second unit pixels located between the first and third signal lines and adjacent to each other, with the gate line interposed between the first and second unit pixels,
the first pixel of the first unit pixel includes the first semiconductor layer and the first pixel electrode;
the second pixel of the second unit pixel includes the second semiconductor layer and the second pixel electrode;
the first pixel of the first unit pixel, the second pixel of the second unit pixel and one of the third pixel of the first unit pixel and the third pixel of the second unit pixel share the gate line; and
the third pixel of the first unit pixel and the third pixel of the second unit pixel share the third signal line.

5. The liquid crystal display device of claim 1, wherein as seen in a plan view in which the first pixel area is located on an upper side and the second pixel area is located on a lower side,
the third region is U-shaped, and intersects the gate line in two positions; and
the sixth region is formed in an inverted U-shape, and intersects the gate line in two positions.

6. The liquid crystal display device of claim 5, wherein the third region and the sixth region intersect the gate line at right angles.

* * * * *